United States Patent Office 2,775,842
Patented Jan. 1, 1957

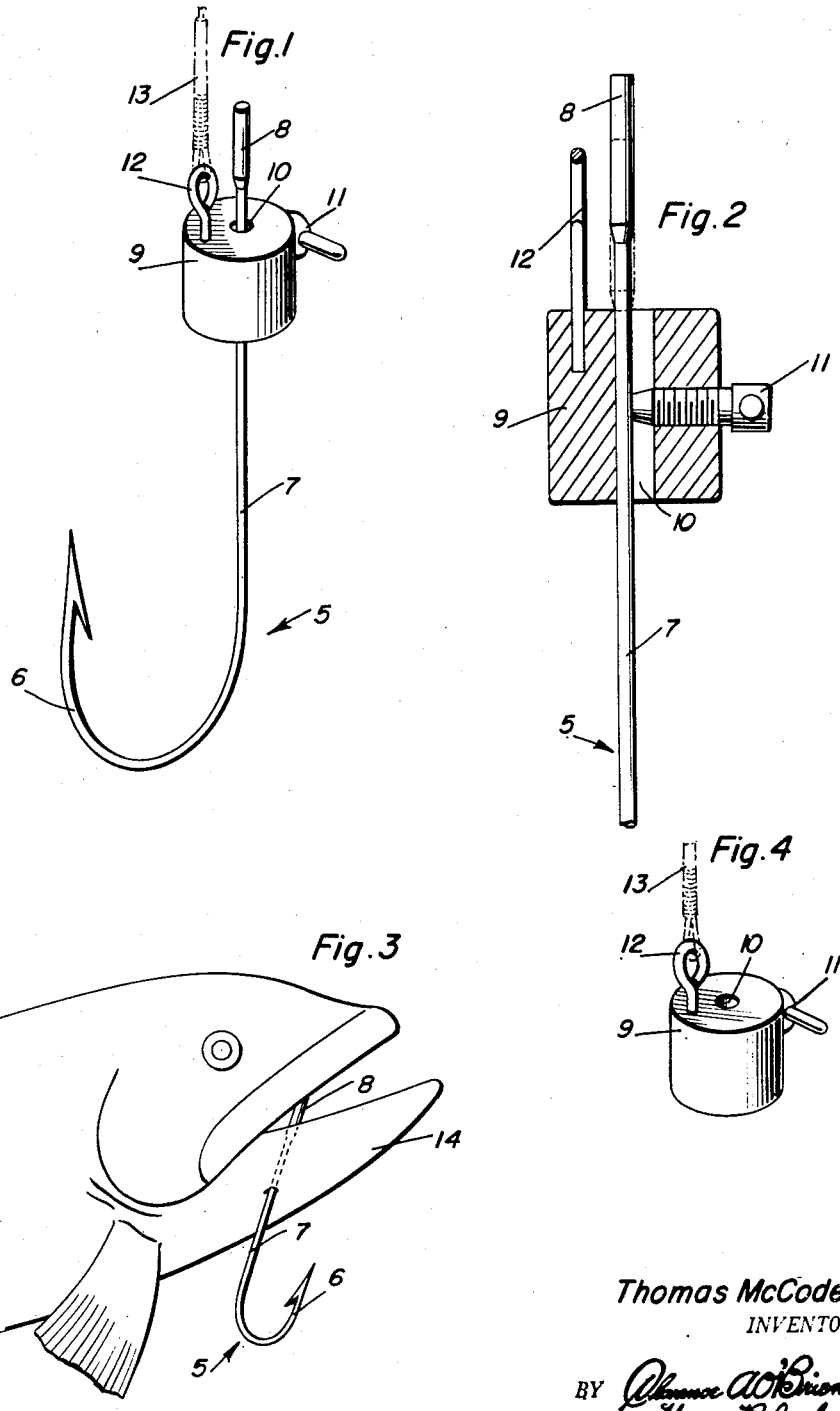

2,775,842
FISHHOOK

Thomas McCode, Philadelphia, Pa.

Application November 1, 1954, Serial No. 466,048

1 Claim. (Cl. 43—44.81)

The present invention relates to new and useful improvements in fishhooks and has for one of its important objects to provide, in a manner as hereinafter set forth, a hook of this character which will be automaically set in the fish when it jerks thereon.

Another very important object of the invention is to provide a hook of the aforementioned character which may be expeditiously and safely removed from the fish after it has been reeled in.

Other object of the invention are to provide a fishhook of the character described which will be comparatively simple in construction, strong, durable, reliable in use and which may be manufactured at low cost.

All of the foregoing and still further objects and advantages of the invention will become apparent from a study of the following specification, taken in connection with the accompanying drawing wherein like characters of reference designate corresponding parts throughout the several views, and wherein:

Figure 1 is a perspective view of a fishhook constructed in accordance with the present invention;

Figure 2 is a view in vertical section through the upper portion of the device;

Figure 3 is a perspective view, showing the method of extracting the hook from the fish; and Figure 4 is a perspective view of the slidable, removable sinker.

Referring now to the drawing in detail, it will be seen that the embodiment of the invention which has been illustrated comprises a hook of suitable metal which is designated generally by reference character 5. The hook 5 includes a barbed bill 6 and a relatively long shank 7, said shank terminating in an enlarged free end portion 8. The enlarged free end portion 8 of the hook 5 constitutes a stop, the purpose of which will be presently set forth.

Slidably and removably mounted on the shank 7 of the hook 5 is a cylindrical sinker 9 of suitable metal. The sinker 9 is of tubular form, said sinker having formed therein a central bore or passage 10 which accommodates the hook shank 7.

Threadedly mounted for adjustment in the sinker 9 and projecting into the bore or passage 10 thereof is a thumb or set screw 11 for engagement by the enlarged end portion 8 of the shank 7. An upstanding eye 12 is anchored in the upper portion of the sinker 9 for connecting a leader or line 13 thereto.

It is though that the operation of the device will be readily apparent from a consideration of the foregoing. Briefly, the hook 5 is baited and the shank 7 is frictionally secured in elevated position in the bore or passage 10 of the sinker 9 by the screw 11. Then, when a fish, as at 14, strikes and jerks the hook, said hook is pulled downwardly through the sinker 9 until suddenly arrested by the stop 8, thus setting said hook in the fish. When the fish has been reeled in, the screw 11 is backed off sufficiently to permit the sinker 9 to be slipped off the shank 7 over the enlarged end portion 8 thereof thereby disconnecting the line from the hook 5. The hook 5 may then be expeditiously and safely removed from the fish by pulling the enlarged end portion 8 thereof outwardly through the fish, substantially as shown in Figure 3 of the drawing.

A preferred embodiment of the device is as illustrated and described but it is to be understood that changes in the details of construction may be resorted to which fall within the scope of the invention as claimed.

What is claimed is:

A fishhook comprising: a tubular sinker for connection to a line, a hook including a bill and a shank mounted for sliding adjustment in the sinker, means frictionally securing the hook in adjusted position in the sinker, and means for positively limiting the sliding movement of the hook in one direction through the sinker, the first named means including a setscrew threadedly mounted in the sinker and engageable with the shank, the last named means including an enlargement on one end of the shank engageable with the setscrew, said sinker having a bore accommodating the enlargement for removing the hook from the sinker when the setscrew is in retracted position.

References Cited in the file of this patent

UNITED STATES PATENTS

| | | |
|---|---|---|
| 237,566 | Marion | Feb. 8, 1881 |
| 590,705 | Killmeier | Sept. 28, 1897 |
| 745,066 | Koch | Nov. 24, 1903 |
| 1,510,774 | Gauthier | Oct. 7, 1924 |
| 2,333,503 | Worden | Nov. 2, 1943 |
| 2,385,274 | Hammond | Sept. 18, 1945 |